United States Patent Office 3,475,255
Patented Oct. 28, 1969

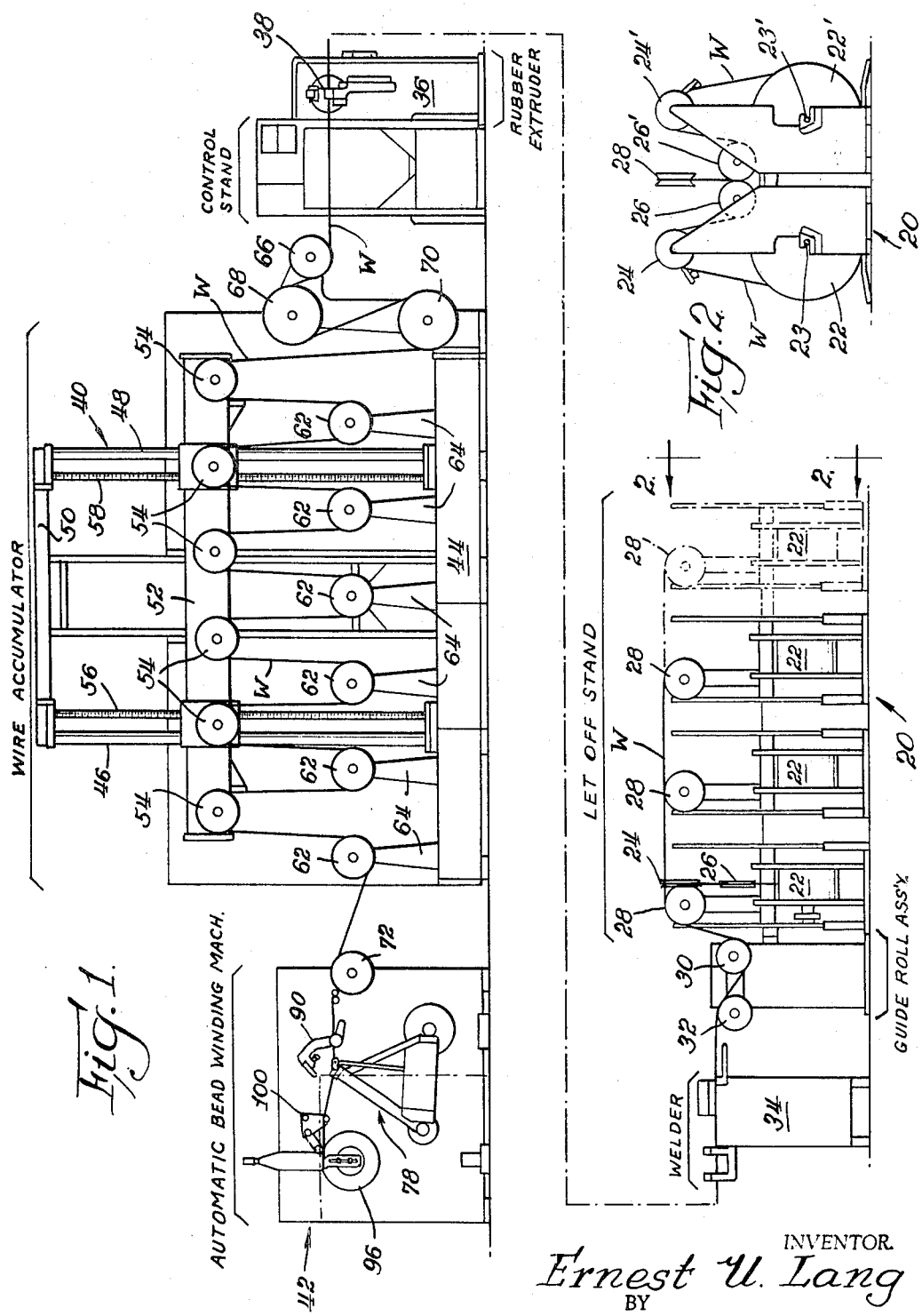

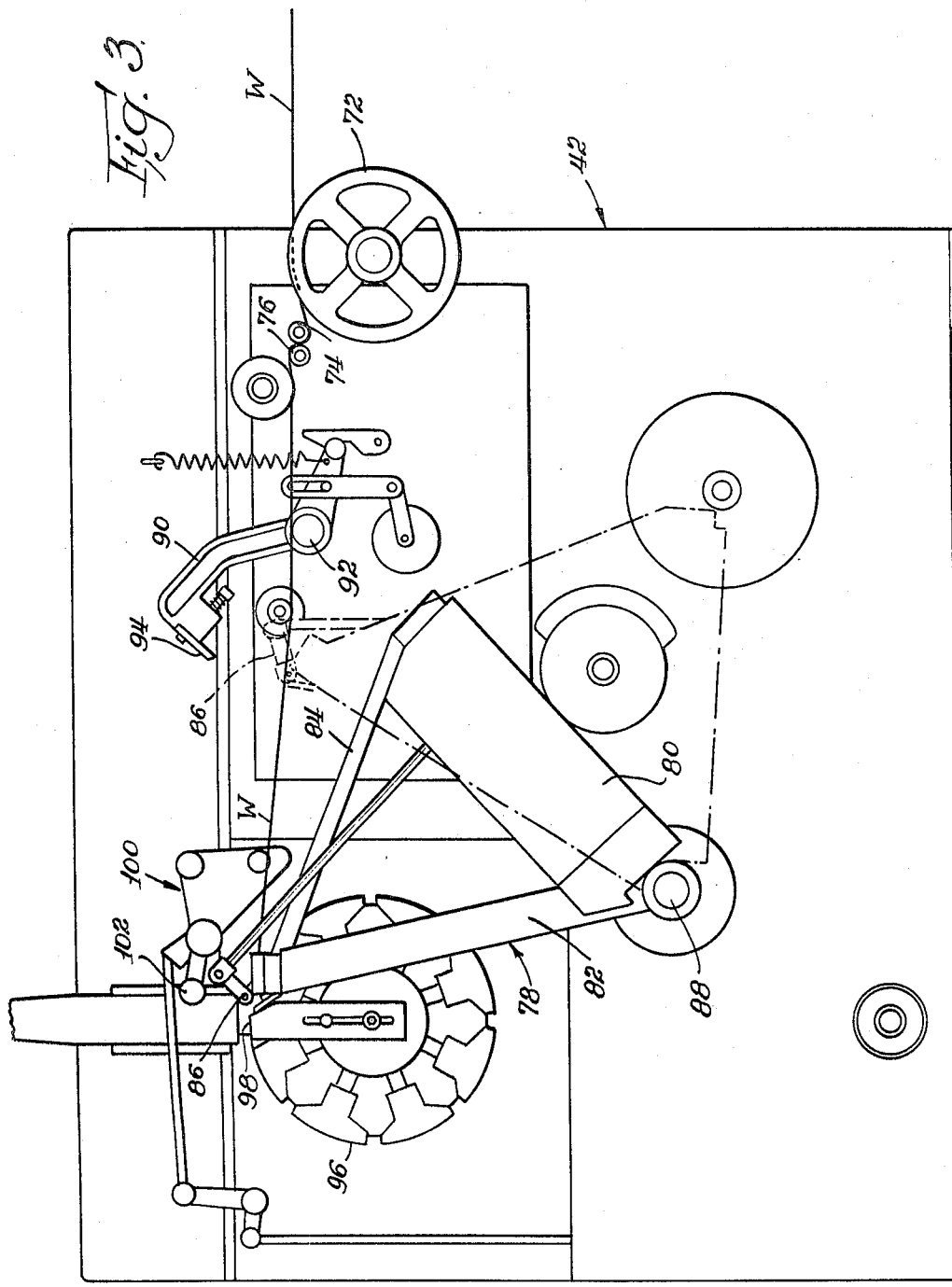

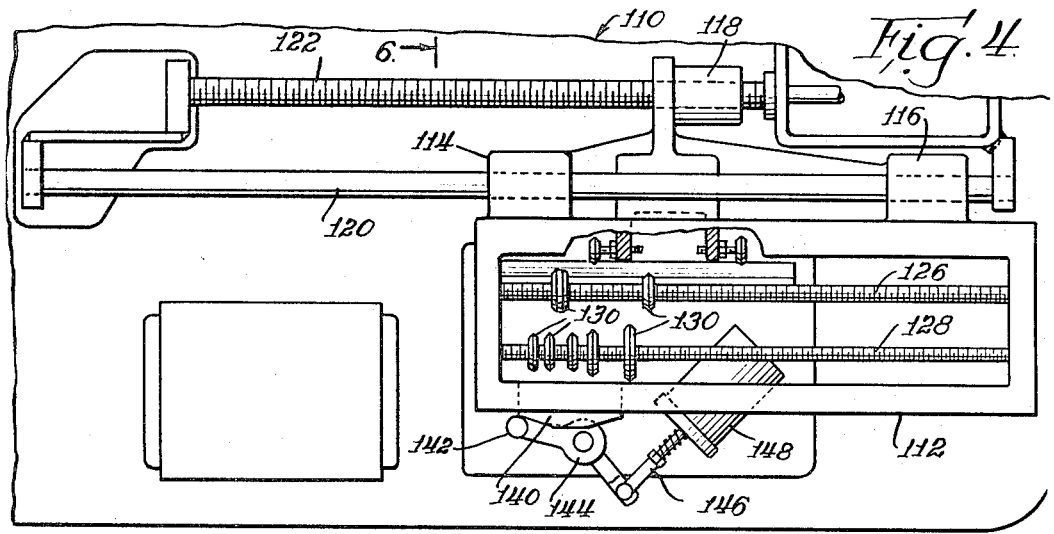
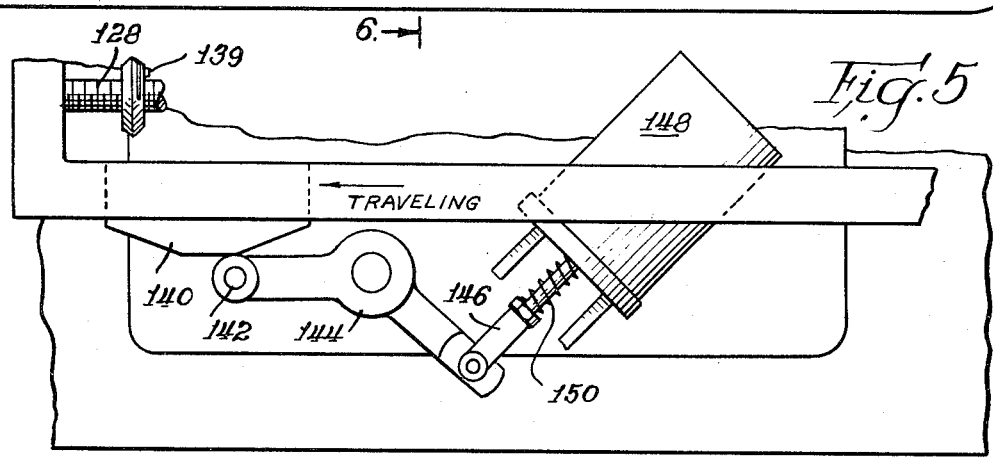
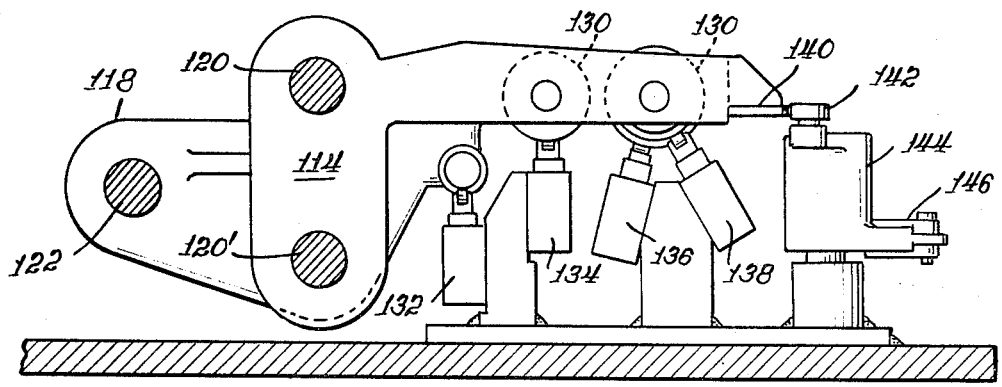

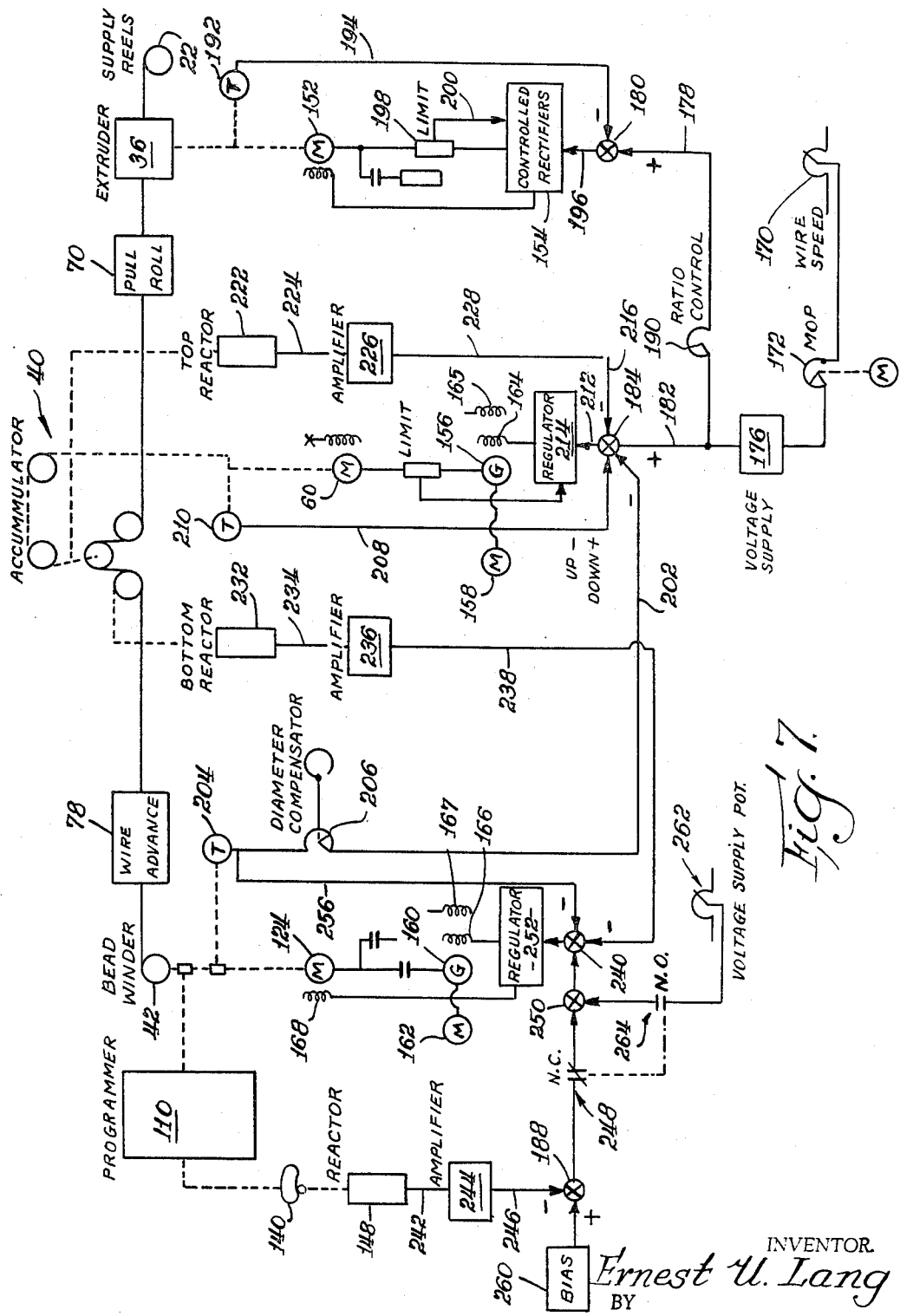

3,475,255
AUTOMATIC TIRE BEAD MAKING APPARATUS
Ernest U. Lang, Niles, Mich., assignor to National-Standard Company, Niles, Mich., a corporation of Delaware
Filed Mar. 24, 1965, Ser. No. 442,293
Int. Cl. B29h 17/32
U.S. Cl. 156—422                                    20 Claims

ABSTRACT OF THE DISCLOSURE

A tire bead making apparatus including bead wire supply reels providing a plurality of continuous lengths of bead wire, an extruder for applying a coating to each of the bead wires, a variable speed bead winder having gripping means for gripping the leading ends of the wires and being rotatable to pull the wires through the extruder and wind the wires to form beads, a wire accumulator disposed between the extruder and the bead winder and having fixed and movable sheaves adapted to receive the bead wires thereon, and circuit control means operatively associated with the bead winder, the extruder and the accumulator and adapted to control movement of the movable sheaves of the accumulator in relation to the rotary speed of the bead winder to maintain generally constant preselected bead wire speed from the extruder.

---

The present invention relates to apparatus for making tire beads, and to a control system for automatically controlling the operation of such apparatus. More specifically, the invention relates to a bead making system comprising a bead winder and a plurality of associated components for supplying bead material to the winder, and to an automatic control system which controls the interaction or cooperation of the foregoing several components.

In the production of many types of rubber tires for automobiles, trucks, aircraft or other uses, it is desirable to strengthen the innermost portion of the tire which fits adjacent the rim with a reinforced section known in the art as a "bead." In the manufacture of tire beads it is known to feed an extrusion head with both a rubber material and with a continuous length of wire which is pulled from a supply reel through the extruder by a motor driven haul-off drum. The wire is coated with a rubber sheath in its passage through the extrusion head, and it is then supplied to an accumulator or festoon which may include an upper and a lower set of sheaves or rolls with the upper set of sheaves rotatably mounted on respective fixed axes and the lower set of sheaves mounted on a vertically movable carriage. A motor driven winder drum is rotated so as to draw the bead wire from the accumulator and wind the wire on the winder drum to form a bead. The bead is formed by winding a predetermined number of convolutions of the bead wire onto the winder drum. For example, to construct a bead of fiteen turns of bead wire, the winder motor is operated to rotate the winder drum through fifteen revolutions, and then the winder drum is stopped, the bead wire supply is severed from the finished bead, and the bead is removed from the winder drum preparatory to the next cycle of operations.

In the known bead making system described hereinabove, the motor driven haul-off drum is normally operated at a nearly constant speed as it pulls the wire through the extruder and supplies it to the accumulator. The motor driven winder drum operates at a variable speed, and in fact must be stopped in order to remove a completed bead, and the accumulator acts as a variable storage member which stores increasing amounts of bead wire when the winder is stopped or is operating at a lesser speed than the haul-off drum, and which pays out bead wire when the winder is operating at a greater speed than the haul-off drum. In such a system the vertically movable lower sheaves of the accumulator are gravity controlled. That is, when the haul-off drum is supplying more wire to the accumulator than the winder drum is removing therefrom, the lower set of sheaves will move downwardly under the influence of gravity, and when the winder is removing more material from the accumulator than the latter is receiving from the haul-off drum, the lower set of sheaves will be drawn upwardly as the amount of bead wire stored in the accumulator diminishes. Control mechanism may also be provided to adjust the speed of the haul-off drum upwardly or downwardly as necessary to maintain the lower movable set of accumulator sheaves within a predetermined range of vertical travel. That is, the haul-off drum may be slowed down when the lower sheaves move too far downwardly, and haul-off drum speed may be increased when the lower sheaves move too far upwardly. A system of the foregoing type is described in greater detail in U.S. Patent 3,049,308 issued on Aug. 14, 1962 to Ernest U. Lang and assigned to the assignee of the present invention.

It should be understood that in a bead making system of the type described above, it is important that the speed of the wire being drawn through the extruder be maintained substantially constant even though the requirements of the winder drum will vary considerably as the latter starts up, accelerates, slows down, stops, etc. Such speed must normally be maintained substantially constant in order to provide a uniform rubber sheath on the wire being drawn through the extruder, since if the wire is stopped at the extruder or even if the wire speed at the extruder is varied appreciably the rubber sheath or coating formed on the wire will be of unsatisfactory quality.

The present invention relates to a bead making system which represents a substantial improvement over the systems heretofore known and which is based on an entirely different concept than the earlier systems, whereby a new and improved mode of operation is produced. The bead making system of the present invention includes a plurality of supply reels on which wire is stored, a rubber extruder through which the wire is drawn, a motor driven bead winder, and an accumulator positioned between the extruder and the bead winder. There is no haul-off drum for pulling the wire through the extruder, since in the system of the present invention the wire is pulled through the extruder by the combined action of the winder and the accumulator. The accumulator has a set of lower stationary sheaves or rolls and an upper set of vertically movable sheaves or rolls, but rather than provide a gravity controlled accumulator, the system of the present invention includes an accumulator drive motor for controlling the raising and lowering of the upper set of sheaves.

In accordance with the present invention, a plurality of beads may be formed simultaneously, there being one supply reel for each bead to be formed during a single cycle of operation of the winder, and the winder pulls individually each strand of wire through the system while retaining a grip on each such strand at all times. Thus, as the winder rotates it pulls each strand of wire from a corresponding supply reel through the extruder and through the accumlator, and the accumulator's upper set of sheaves is driven upwardly and downwardly by the accumulator drive motor so as to correct the speed of the strands through the extruder to match a predetermined desired speed at the extruder.

Accordingly, if the winder as it rotates is pulling wire at a speed equal to the predetermined desired wire speed at the extruder, then the accumulator motor is stopped since no correction is required. When the winder due to its rotation is pulling the wire at a speed less than the desired wire speed at the extruder, the upper set of accumulator sheaves are driven upwardly causing the accumulator to fill and thereby assist in pulling wire through the extruder, the accumulator being driven by its motor at a speed which is dependent upon the speed of the winder so that the winder and accumulator acting together will produce the preset desired wire speed at the extruder. When the winder stops to permit removal of a completed bead, the accumulator's upper set of sheaves is driven upwardly by the accumulator motor at a maximum speed which is such that the action of the accumulator alone as it fills will pull the wire through the extruder at the desired predetermined wire speed, while the leading end of the wire is being held by wire advance mechanism as will be explained later herein. When the winder is rotating so as to pull the wire at a speed greater than the desired wire speed at the extruder, the accumulator's upper set of sheaves is driven downwardly by the accumulator motor at a speed which will cause the accumulator to empty or pay out wire at a rate which will offset the excessive speed of the winder and produce the predetermined desired wire speed at the extruder.

It is therefore an object of the present invention to provide an improved bead making system wherein a motor driven accumulator serves to continuously compensate for the variable speed of a bead winder to thereby provide a desired predetermined wire speed at an extruder.

Another object of the invention is to provide a bead making system wherein the winder and the accumulator acting together pull a strand of wire from a supply reel and through an extruder.

A further object of the invention is to provide a bead making system including a motor driven accumulator, a bead winder and an extruder, where the accumulator is driven in one direction causing it to fill or increase its storage capacity when the winder is pulling the bead wire at a speed less than the desired wire speed at the extruder, and where the accumulator is driven in the opposite direction to empty or decrease its storage capacity when the winder is pulling the bead wire at a speed greater than the desired wire speed at the extruder.

An additional object of the invention is to provide a bead making system particularly suited for the manufacture of a plurality of beads simultaneously, where each bead is formed from a separate strand of wire which is pulled individually from a corresponding supply reel through the extruder by the combined action of a bead winder and an accumulator.

The foregoing and other objects and advantages of the invention will be apparent from the following description thereof.

Now in order to acquaint those skilled in the art with the manner of utilizing and practicing my invention, I shall described, in conjunction with the accompanying drawings, certain preferred embodiments of my invention.

In the drawings:

FIGURE 1 is a front elevational view of a bead making system constructed in accordance with the present invention including a plurality of supply reels, a rubber extruder, a motor driven accumulator, and an automatic bead winding machine;

FIGURE 2 is an end elevational view looking substantially in the direction of the arrows 2—2 of FIGURE 1 showing the supply reels and associated guide rollers;

FIGURE 3 is an enlarged front elevational view of the automatic bead winding machine of FIGURE 1 showing wire cutting mechanism, wire advance mechanism, and a collapsible winder drum;

FIGURE 4 is an enlarged fragmentary top plan view of a programmer comprising a slidable carriage which is driven from the bead winder motor and has cams thereon for controlling the speed of the bead winder and various other operations of the bead winding apparatus;

FIGURE 5 is a substantially enlarged fragmentary top plan view of a portion of the apparatus of FIGURE 4 showing in partciular a reactor member for controlling bead winder speed, and cam means carried on the slidable carriage of the programmer for actuating the reactor;

FIGURE 6 is a fragmentary sectional view taken substantially along the line 6—6 of FIGURE 4; and FIGURE 7 is a schematic diagram of the electrical control system for the bead making apparatus of the present invention.

Referring now to the drawings, FIGURE 1 shows a let off stand 20 on which a plurality of wire supply reels 22 are mounted. In the embodiment shown in FIGURES 1 and 2, there are eight supply reels 22 arranged in two parallel rows of four reels each, the reels being rotatable about horizontal axes as shown at 23 and 23' in FIGURE 2. Two of the reels 22 are shown in dotted lines since in the system to be described herein the winder drum is designed to form six beads simultaneously, and thus only six supply reels are required. Of course the system can be used to manufacture a greater or a lesser number of tire beads during a given operating cycle as desired.

FIGURE 2 shows the manner in which a strand of wire W is fed from one of the supply reels 22 upwardly over a guide roller 24, under a guide roller 26, and then over a guide roller 28. Wire from an oppositely disposed supply reel 22' passes over a guide roller 24', under a guide roller 26' and then over the common guide roller 28. Since the strands of wire W from the several supply reels 22 and 22' are fed over the common guide rollers 28, the latter rollers are provided with a plurality of separate grooves therein so as to maintain each of the several strands of wire separate from one another. For example, if six tire beads are to be formed simultaneously, then six of the reels 22 will be utilized, and thus the guide roller 28 which is farthest to the left in FIGURE 1 will carry six separate strands of wire thereon, and each of the wires will run in a separate groove in the roller. The wires that pass over the guide rollers 28 are still bare and thus each individual wire is capable of slipping on the rollers relative to the other wires thereon. However, if desired, the several rollers 28 may each be comprised of an appropriate number of individually rotatable discs, one for each wire, in order to insure that the wires are capable of independent movement over the rollers. It is also important to understand that each of the supply reels 22 and 22' has braking means associated therewith to control the drag or resistance to rotation of the reel, whereby the brakes automatically and individually control the tension in each of the several strands of wire being pulled from their respective reels. The specific structure of the brakes is not relevant to the present invention and will not be described herein.

As the wire W leaves the common guide rollers 28 it passes forwardly over guide rollers 30 and 32, through a welder 34, and then through a rubber extruder 36 having an insulating head 38. The rubber extruder 36 may be of a known type except that it has a die adapted to accommodate several separate strands of wire, and rubber is supplied to the die to produce a rubber coating on the strands of wire W pulled therethrough. The specific structure of the extruder 36 is not relevant to the present invention and will not be described herein, but it will be understood that a screw mechanism is provided for grinding up rubber supplied thereto, and a motor is provided to drive the screw mechanism. Thus, solid pieces of rubber are supplied to the extruder 36, and the motor driven screw mechanism (not shown) pulverizes the rubber so as to render it suitable for supplying to the insulating head 38. In such a device it is desirable that the extruder motor be driven at a proper speed depending upon the number of wires being coated and the speed of the wires being pulled through the extruder, since if the screw is operated too fast, excess rubber will be supplied to the die and will overflow from the extruder onto the floor. It is important to understand however that the wires are pulled through the extruder 36 by a winder and an accumulator to be described hereinafter, and the operation of the extruder motor does not in any way affect the speed at which the wires are pulled through the extruder.

As the wires leave the extruder 36 they pass through an accumulator 40 and then to an automatic bead winding machine 42. The accumulator 40 comprises a base 44, a pair of upright guide rods 46 and 48, and an upper frame structure 50 which extends between the upper ends of the guide rods. A carriage 52 extends horizontally and has mounted thereon six upper sheaves or rolls 54 which are arranged in a horizontal row. Each of the sheaves 54 must be adapted to accommodate six separate strands of wire W in side-by-side relation, and for this purpose each of the sheaves 54 may include six idler discs or the like mounted side-by-side in axial alignment for rotation independently of one another. The carriage 52 is movable upwardly and downwardly on the vertical guide rods 46 and 48 by a pair of vertical feed screws 56 and 58 which are driven by an accumulator motor 60 (see FIGURE 7). A lower set of sheaves 62 are mounted on stationary supports 64. There are in the embodiment being described six stationary supports 64 which extend upwardly from the accumulator base 44, and a lower sheave 62 is mounted adjacent the upper end of each of the supports 64.

As the wires W leave the extruder 36 they pass under a guide roller 66, over a guide roller 68, and then under a pull roll 70. Thereafter, the wires are threaded through the accumulator passing over the first upper sheave 54, under the first lower sheave 62, over the second upper sheave 54, under the second lower sheave 62, and so on until the wires pass under the extreme left hand lower sheave 62 and then to the automatic bead winding machine 42. It will be understood that when the accumulator motor 60 is operated to drive the upper flight of sheaves 54 upwardly away from the lower flight of sheaves 62, the amount of wire stored in the accumulator will be increased, and when the upper flight of sheaves 54 is driven downwardly toward the lower flight of sheaves 62, the amount of wire stored in the accumulator will be decreased. Thus, the accumulator 40 fills when it is driven upwardly and empties when it is driven downwardly.

It will be understood that during the initial threading of the wires through the accumulator, the upper set of sheaves 54 can be driven downwardly to an extreme lowermost position wherein they are disposed beneath the level of the lower set of sheaves 62, and in this position the several strands of wire W can be passed straight through between the upper and lower sets of sheaves thereby simplifying the threading operation. The threading operation is also facilitated by the pull roll 70 which serves to pull the wires so that an operator in effect need only grip the leading ends of the six wires and walk them straight through the accumulator. The specific structure of the pull roll 70 is not relevant to the present invention and thus is not described in detail herein. However, such pull roll may comprise a plurality of rolls which normally function as idler rolls so as to be freely rotatable independently of one another, whereby during operation of the bead making system the pull roll 70 will function as a guide roller having an independently rotatable roll for each of the several strands of wire. However, the pull roll 70 is constructed so that during a threading operation the several rolls are clutched together and driven as a unit at a slow speed by an AC motor so as to pull the wires from their supply reels 22 thereby permitting an operator to simply walk the wires through the accumulator 40 as previously described.

In order to describe the automatic bead winding machine 42, reference is made to FIGURE 3. It will be seen that the wires W pass over a large guide roller 72, between a pair of small rollers 74 and 76, and then to a wire advance mechanism 78. The wire advance mechanism 78 comprises a generally triangular structure including a base 80 and a pair of side legs 82 and 84 which extend from opposite ends of the base and meet approximately at a wire gripper head 86. The wire advance mechanism 78 is pivotable about a pivot 88 at one end of the base 80 so as to be movable between an advanced position as shown in solid lines and a normal retracted position as indicated schematically in dash lines. The bead winding machine 42 further includes a wire cutter member 90 which is pivotable about a shaft 92 and carries a knife 94, and a collapsible winder drum 96 having gripping means 98 for gripping the leading ends of the six wires W.

During the initial threading of the wire W through the system, the advance mechanism 78 is in its normal retracted position as shown in dash lines. The wire is passed through the gripper head 86 of the advance mechanism, and the cutter 90 is operated to cut off all but a small portion of the leading ends of the wires which project to the left of or beyond the gripper head 86. The advance mechanism 78 is then pivoted about the shaft 88, whereby the gripper head 86 pulls the wires W forwardly to the left and disposes them in position to be gripped by the gripper member 98 associated with the winder drum 96. Thereafter, the gripper head 86 is released so that it no longer grips the wires, and the advance mechanism 78 is returned to the retracted position shown in dash lines. Accordingly, with the wires passing freely through the advance mechanism gripper head 86, with the latter in its retracted position, and with the leading ends of the wires attached to the winder drum 96 by the gripping means 98, the winder drum can be rotated to form a plurality of beads, in this instance six beads since six separate strands of wire are provided.

It is not believed necessary for an understanding of the bead making system of the present invention to describe in detail the advance mechanism gripper head 86 or the gripper 98 associated with the winder drum 96. It will of course be understood that the gripper head 86 is movable between a gripping position wherein each of the six strands of wire are firmly gripped and held thereby, and a released position wherein the wires can pass freely through the gripper head. In addition, it will be understood that in any bead making system the winder drum must be provided with gripping means for attaching the leading end of a wire thereto, and in this instance since six beads are formed simultaneously, the winder gripping means 98 is designed to grip the leading ends of six separate strands of wire. It will further be understood that the winder drum 96 is provided with six separate grooves, whereby as the drum rotates, the separate strands of wire W are wound in the grooves in a predetermined pattern to form six separate beads.

A traverse mechanism indicated generally at 100 in FIGURE 3 is provided to control the laying of the wires in the grooves of the winder drum 96, and such mechanism includes a plurality of side-by-side grooved rollers 102, one for each strand of wire W. The traverse mechanism 100 is shown in its retracted position while the wire advance mechanism 78 is in its forward position, but it will be understood that during the formation of a plurality of beads while the winder drum 96 is rotating, the grooved rollers 102 of the traverse mechanism will bear downwardly upon respective ones of the strands of wire, whereby as the traverse mechanism moves laterally back and forth it will control the laying of the wires in the corresponding grooves of the winder drum 96. For example, the winder drum 96 may make twenty revolutions during a bead making cycle, and the traverse mechanism 100 will control the laying of the wire to provide a given number of side-by-side strands in each of a predetermined number of layers to produce a bead of substantially any desired cross section.

As the winder drum 96 starts to rotate it will accelerate at a predetermined rate, and if desired it can be controlled to increase its rate of acceleration after a certain number of revolutions as will be described later herein. The winder drum will reach a predetermined maximum speed and will rotate at such maximum speed for a given number of revolutions, after which it will be decelerated and stopped. When the winder drum 96 has been stopped, the wire advance mechanism 78 which will be in its retracted position at such time is actuated to grip the wires W at the gripper head 86, and thereafter the cutter 90 is actuated to cut the wires immediately forwardly of the gripper head 86. The winder drum 96 is then rotated a further portion of a revolution to pull in the tails or trailing ends of the beads, after which the winder drum is collapsed and the finished beads are removed.

At the completion of the foregoing operations, the winder drum 96 will be positioned with the gripping means 98 at the top thereof, and with the winder drum in collapsed condition the advance mechanism 78 is actuated to pull the leading ends of the wires forwardly into position to be gripped by the winder gripping means 98. After the advance mechanism is retracted and the winder drum expanded, the bead making cycle is then repeated as previously described. By way of example, the running time of the winder drum 96 may be from 4 to 60 seconds depending upon the size of the beads being produced, while the down time may be from 3 to 5 seconds. Accordingly, the bead winder 42 may go through approximately 6 cycles per minute when small beads are being produced, whereas 1 to 3 cycles per minute is more typical when large beads are being produced. The particular winder drum 96 described herein is adjustable between a 12 inch diameter and a 24 inch diameter depending upon the size of bead desired, but the gripper member 98 is always in the same starting position as shown in FIGURE 3 regardless of the winder diameter. That is, the axis of the winder drum will be shifted upwardly or downwardly depending upon whether the diameter is being decreased or increased.

FIGURES 4–6 show a programmer 110 for controlling the operation of the automatic bead winding machine 42. A carriage 112 is provided with three lug members 114, 116 and 118, and the carriage is movable horizontally along a pair of guide rods 120 and 120' which extend through the lugs 114 and 116, the carriage being driven along a rectilinear path by a rotatable feed screw 122. The feed screw 122 is driven from a window motor 124 (see FIGURE 7) so that there will always be correlation between the position of the winder drum 96 and the position of the programmer carriage 112. A pair of threaded rods 126 and 128 are fixedly mounted on the carriage 112 for movement therewith, and a plurality of cam discs 130 are carried on the threaded rods for actuating various switches such as shown at 132, 134, 136 and 138 in FIGURE 6. As the winder drum 96 is rotated during a bead making cycle, the programmer carriage 112 is driven along its rectilinear path in correlation with the winder drum, and the cams 130 on the carriage engage corresponding switches such as those shown in FIGURE 6 to control various functions of the bead winder mechanism. For example, the switches serve to control the operation of the traverse mechanism 100 which must of course be reversed each time one layer of the bead cross section has been completed and a new layer is to be started. It will be understood that the cams 130 can be manually rotated on the threaded rods 126 and 128 to adjust the position of the cams, and set screws as shown at 139 in FIGURE 5 may be provided to lock each cam in a desired position.

A cam 140 (best shown in FIGURE 5) is mounted on the side of the carriage 112 and engages a follower roller 142 carried on one end of a bellcrank lever 144. The other end of the bellcrank lever 144 is connected to a plunger 146 of a reactor or linear actuator 148. The plunger 146 is disposed within a plurality of coils energized by an A.C. source, whereby as the plunger moves it changes the reactance of the coils to produce a signal which varies in accordance with the displacement of the plunger. The reactor 148 is also shown in FIGURE 7, and as will be explained more fully hereinafter it controls the speed of the beadwinder motor 124 so as to control the acceleration and deceleration of the winder drum 96. Accordingly, as the winder drum 96 rotates, the cam 140 moves to the left as viewed in FIGURE 5. As the cam 140 acts on the bellcrank 144 to move the plunger 146 into the reactor 148, the speed of the winder drum 96 is increased proportionately, and as the cam permits the plunger 146 to withdraw from the reactor 148 under the influence of a compression spring 150, the speed of the winder drum is decreased proportionately. Thus, a first slow acceleration rate and its time of application, a second final acceleration rate, maximum speed reference and the deceleration rate of winder drum 96 are all controlled by the shape of the cam 140 carried by the programmer carriage 112.

Reference is now made to FIGURE 7 which is a diagram of the basic electrical controls for the bead making system of the present invention. There are provided three D.C. variable voltage systems each having a motor and a variable voltage D.C. power source, one for driving the extruder 36, one for driving the accumulator 40, and one for driving the bead winder 42. A motor 152 drives the extruder 36, that is, the motor drives the screw mechanism of the extruder for pulverizing rubber supplied thereto. The extruder motor 152 is driven by a 3 phase silicon controlled rectifier circuit indicated at 154, it being understood that the speed of the motor 152 determines the amount of pulverized rubber which is supplied to the insulating head 38 of the extruder 36. The accumulator motor 60 drives the feed screws 56 and 58 to drive the upper set of accumulator rolls or sheaves 54 upwardly and downwardly as previously described, and the motor 60 is driven in either direction by a generator 156 which controls the armature voltage of the motor 60 and which in turn is driven by an A.C. motor 158. The bead winder motor 124 has an armature voltage controlled by a second generator 160 in order to drive the winder drum 96, and the generator 160 is in turn driven by an A.C. motor 162.

It will be understood from the foregoing that in the particular embodiment being described the accumulator motor 60 and the bead winder motor 124 are both powered by motor generator sets each of which comprises an A.C. drive motor which is used to turn a corresponding D.C. generator at a constant angular velocity. In the accumulator drive system, a control signal to be described hereinafter is used to energize a field 164 of the D.C. generator 156 which in turn controls the armature voltage of the accumulator motor 60. The generator 156 has two fields, the main field 164, and an auxiliary field 165 which is excited from constant potential. In the bead winder drive system, a control signal to be described hereinafter is used to energize both a field 166 of the D.C. generator 160 and also a field 168 of the bead winder motor 124. The generator 160 also has an auxiliary field 167 which is for residual buckout and is excited from a constant potential supply.

It is an important aspect of the present invention that the accumulator carriage 52 which carries the upper sheaves 54 is driven upwardly and downwardly causing the accumulator to fill or empty as necessary to correct the wire speed at the extruder 36 and thereby maintain a constant predetermined wire speed at the extruder regardless of variations in the speed of rotation of the winder drum 96. For example, if the predetermined desired wire speed at the extruder 36 is 600 feet per minute, and if the winder drum 96 is rotating at a speed which causes the wire to be pulled at 600 feet per minute, then the accumulator motor 60 is stopped since no correction of the wire speed is necessary. If the wire drum 96 is rotating so as to pull the wire faster than 600 feet per minute, as will be the case when the winder is operating at or near its maximum speed, the upper accumulator sheaves 54 are driven downwardly so that the accumulator will pay out wire at a rate which will compensate for the high speed of the winder and thereby provide the desired wire speed of 600 feet per minute at the extruder, and of course the proper speed for the accumulator motor 60 will depend upon precisely how fast the winder drum 96 is rotating. On the other hand, if the winder drum 96 is rotating so as to pull the wire at a speed less than 600 feet per minute, then the accumulator motor 60 must be driven in the opposite direction so as to drive the upper accumulator sheaves 54 upwardly causing the accumulator to fill. In the latter instance, the action of the winder drum 96 and the action of the accumulator 40 will add together in producing the desired wire speed at the extruder 36. It will further be noted that when the winder drum 96 is stopped for the purpose of removing a completed bead, the accumulator sheaves 54 will be driven upwardly at such a speed that the accumulator 40 acting alone as it fills will pull the wire through the extruder at the desired speed of 600 feet per minute, and during such time the leading ends of the several strands of wire W will be held in the gripper head 86 of the wire advance mechanism 78 or in the gripping means 98 of winder drum 96.

FIGURE 7 shows a potentiometer 170, a motor operated potentiometer 172, and a timed reference voltage supply 176, all of which in combination control the speed of the wire through the extruder. The function of the timed reference voltage supply 176 is to give a gradual initial acceleration to the wire speed and consequently, the let-off reels 22. Two modes of operation are possible in determining the wire speed when making a bead of a given size and number of convolutions. Motor operated potentiometer 172 may be made inoperative and the running speed will be a function solely of the setting of potentiometer 170 which is housed in a cabinet not under operator control. With this first method, the running speed will be the same for all beads, and is used when a definite constant extrusion speed is demanded. In the second mode of operation, potentiometer 170 is used to set a limiting maximum extrusion speed. This again is not under operator control. Under his control, however, are "Increase-Decrease" push buttons (not shown) for motor-operated potentiometer 172 which must be set reasonably close to a charted wire speed for a bead of a given size and number of convolutions. Motor-operated potentiometer 172 is then automatically verniered to obtain the optimum wire speed for the given bead.

The D.C. output signal from the voltage supply 176 may be referred to hereinafter as the reference signal. It will be seen that the D.C. reference signal is conducted by a lead 178 to a summing network or junction 180 associated with the drive system for the extruder 36. The reference signal is also conducted by a lead 182 to a summing network 184 associated with the drive system for the accumulator 40.

When a greater voltage is supplied to the control circuit for the silicon controlled rectifiers of the power source 154, the control circuit enables the rectifiers to conduct for a longer period during each cycle of the A.C. voltage supplied to the rectifiers. Thus, a greater amount of current is supplied to the extruder motor 152 during each cycle of input voltage, and the speed of the extruder motor increases. In other words, the speed of the extruder motor 152 varies in accordance with the strength of the reference signal from the voltage supply 176, and this in turn determines the amount of pulverized rubber which is supplied to the extruder insulating head 38. However, the strength of the reference signal from the voltage supply 176 to determine the desired wire speed at the extruder 36 is not the only factor relevant to the desired speed of the extruder motor 152, since other factors such as the number of strands of wire to be coated are also important. Accordingly, a ratio control member 190 is provided in the line 178 to adjust the strength of the reference signal which is supplied to the summing network 180. The ratio control 190 permits adjustment of the magnitude of the reference signal conducted to the summing network 180 so that the speed of the extruder motor 152 can be regulated for a given desired wire speed in accordance with other factors such as the number of wires passing through the extruder.

A tachometer generator 192 is mechanically connected with the extruder motor 152 so as to be driven thereby, and the tachometer feeds back a negative D.C. signal proportional to the speed of the motor, such signal being conducted along a lead 194 to the summing network 180. The positive reference signal from the timed reference voltage supply 176 will cause the extruder motor 152 to increase its speed until the negative feedback voltage from the tachometer 192 substantially cancels out the reference signal to leave a resultant input signal indicated at 196 which when supplied to the power source 154 will cause the extruder motor 152 to be driven at a speed determined by the strength of the reference signal and ratio control 190. In other words, as the extruder motor 152 is coming up to its proper speed the negative D.C. feedback signal from the tachometer 192 is increasing and is thereby decreasing the resultant input signal at 196 until equilibrium is reached and the resultant input signal is of a magnitude to drive the motor 152 at a proper speed proportional to the desired wire speed at the extruder. A current limit 198 feeds a signal back along a lead 200 to the power source 154 and serves to limit the current which is supplied to the extruder motor 152 thereby acting as a safety device to protect the motor and the silicon controlled rectifier circuit 154.

Referring now to the drive system for the accumulator 40, it is important to understand that the motor generator set 156, 158 which drives the accumulator motor 60 comprises a contactless, fully reversible variable voltage D.C. system which can vary from a full positive voltage to a full negative voltage without opening or closing any contacts or switches. That is, the drive system 156, 158 is infinitely adjustable through the zero position and can hover at zero, since as previously indicated the upper accumulator sheaves 54 must be driven both upwardly and downwardly at any desired speed and must also be stopped when the winder drum 96 is operating at such a speed that the winder acting alone will produce the preset desired wire speed at the extruder 36.

At the summing network 184 for the accumulator drive system, there is a feedback signal conducted along a lead 202 from a tachometer generator 204 which is driven by the bead winder motor 124. The feedback signal which is conducted to the summing network 184 from the tachometer 204 is a negative signal proportional to the speed at which the wire is being pulled due to rotation of the winder drum 96. It will be understood that the signal actually produced by the tachometer generator 204 will be proportional to the speed of rotation of the winder drum 96, and since the diameter of the winder drum is variable, it is necessary to correct the signal in accordance with the winder drum diameter in order that the signal will indicate wire speed produced by the winder drum. A diameter compensator comprising a cam driven potentiometer 206 is provided in the line 202 for adjusting the signal from the tachometer 202 in accordance with the winder drum diameter. When the diameter of the winder drum 96 is incerased, the resistance of the diameter compensator 206 is decreased, and when the diameter of the winder drum 96 is decreased, the resistance of the compensator 206 is increased. For example, if the diameter of the winder drum 96 were increased from 12 inches to 24 inches, then for a given winder drum r.p.m. the signal produced by the tachometer 204 will be the same, even though the wire speed produced by the rotation of the larger winder will be double. Thus, by appropriately reducing the resistance of the compensator 206, the signal fed along line 202 to the summing network 184 will be increased and thereby corrected so as to indicate wire speed in feet per minute.

A second feedback signal is conducted to the summing network 184 along a lead 208 from a tachometer generator 210 which is driven by the accumulator motor 60. As previously indicated the motor 60 is driven in either direction in order to drive the accumulator sheaves 54 upwardly and downwardly, and the feedback signal from the tachometer 210 will be negative when the sheaves 54 are being driven upwardly and will be positive when the sheaves 54 are being driven downwardly. It is important to understand that the two feedback signals from the tachometers 204 and 210 must add up to a signal which will offset the positive reference signal from the timed reference voltage supply 176 by such an amount that a resultant input signal indicated at 212 will cause the accumulator to be driven in the proper direction at the proper speed, as will be explained more fully hereinbelow.

The servo system for driving the accumulator 40 includes a speed regulator 214 comprising a transistorized D.C. amplifier with a magnetic amplifier driver which receives the resultant input signal over lead 212 from the summing network 184. The accumulator motor 60 as previously indicated is fully reversible and its direction of rotation depends on the polarity of the resultant D.C. input signal conducted from the summing network 184 to the regulator 214. As noted above, the regulator 214 includes a transistorized D.C. amplifier with a magnetic amplifier driver, and the input signal to the regulator 214 is amplified by the transistorized D.C. amplifier and is applied to the windings 164 of the D.C. generator 156 by the magnetic amplifier. If a negative input signal is fed to the regulator 214, the generator 156 will put out a voltage which causes the accumulator motor 60 to drive the upper accumulator sheaves 54 downwardly. If a positive input signal is received by the regulator 214, the polarity of the signal in the generator windings 164 is automatically reversed by the above-mentioned transistorized and magnetic amplifiers which in turn reverses the armature voltage of the accumulator motor 60. The motor 60 then rotates in the opposite direction so as to drive the upper accumulator sheaves 54 upwardly. Since the polarity of the signal energizing the generator windings 164 is reversed in the transistorized and magnetic amplifiers, no contacts or switches are needed to reverse the voltage.

While there is a fourth signal supplied to the summing network 184 over a lead 216, as will be explained hereinafter, the latter signal is normally of no effect except when the accumulator approaches the upper end of its travel, and thus there are three prinicapl signals supplied to the summing network 184 of the accumulator drive system. The positive reference signal from the timed reference voltage supply 176 indicates the desired wire speed at the extruder 36. The negative feedback signal from the winder motor tachometer generator 204 indicates the speed at which the wire is being pulled due to rotation of the winder drum 96. The feedback signal from the accumulator tachometer generator 210 indicates the effect which the movement of the upper set of sheaves 54 is having on the wire speed at the extruder 36, such effect being additive with the action of the winder drum 96 if the signal from the tachometer 210 is negative indicating upward movement of the sheaves 54 to fill the accumulator, and such effect being to partially offset the action of the winder drum if the signal from the tachometer 210 is positive indicating downward movement of the sheaves 54 to empty the accumulator.

It will of course be understood that the magnitude of each of the foregoing three signals is proportional to wire speed in feet per minute so that such signals can be combined in the summing network 184 to produce a proper resultant input signal at the regulator 214. Thus, if the desired wire speed at the extruder 36 is 600 feet per minute, and if the winder drum 96 is rotating at a speed which causes the wire to be moved at 600 feet per minute, then the accumulator motor 60 should be stopped, and in this instance the negative feedback signal from the winder tachometer 204 will equal the positive reference signal from the timed reference voltage supply 176 and thus there will be no resulting input signal to the regulator 214.

When the winder drum 96 rotates so as to pull the wire at a speed in excess of the desired wire speed of 600 feet per minute, the magnitude of the negative signal from the winder tachometer 204 will be greater than the magnitude of the positive reference signal from the voltage supply 176, and the resultant negative input signal conducted to the regulator 214 will cause the motor 60 to drive the accumulator sheaves 54 downwardly at a speed which will offset the excess wire speed produced by the winder drum 96 and thereby produce the desired wire speed of 600 feet per minute at the extruder 36. When the accumulator sheaves 54 are thus driven downwardly, the accumulator tachometer 210 will produce a positive feedback signal which is fed over the lead 208 to the summing network 184, and the magnitude of such feedback signal will equal the difference between the magnitude of the feedback signal from the winder tachometer 204 and the magnitude of the reference signal from the voltage supply 176. In other words, assuming the winder drum 96 is pulling the wire faster than the desired wire speed at the extruder, the faster the winder drum rotates the greater will be the magnitude of the negative signal from the tachometer 204. Under such conditions, the greater will be the speed at which the accumulator sheaves 54 will have to be driven downwardly in order that the positive signal from the tachometer 210 will when combined with the negative signal from the tachometer 204 equal the reference signal from the voltage supply 176.

On the other hand, if the winder drum 96 is rotating so as to pull the wire at a speed less than the desired wire speed at the extruder 36, the negative signal from the tachometer 204 will be less than the positive signal from the voltage supply 176, and a resultant positive input signal will be fed to the regulator 214 causing the motor 60 to drive the accumulator sheaves 54 upwardly thereby to provide the desired wire speed at the extruder 36. In the latter instance the accumulator tachometer 210 will produce a negative signal which when added to the negative signal from the winder tachometer 204 will equal the positive reference signal from the voltage supply 176. In summary, the positive reference signal from voltage supply 176 indicates the desired wire speed at the extruder 36, the negative feedback signal from the winder tachometer 204 indicates the wire speed which the winder drum acting alone is producing at any given instant, and the difference between the two foregoing signals determines by its polarity and magnitude whether the accumulator sheaves 54 should be driven upwardly or downwardly and the speed at which they should be driven to correct the wire speed at the extruder 36 to match a predetermined desired wire speed.

Mechanism will now be described for reducing the speed of the accumulator motor 60 in the event the upper accumulator sheaves 54 are driven upwardly beyond a predetermined limiting position. A top reactor or linear actuator 222 is provided which is similar to the reactor shown at 148 in FIGURE 5. That is, the reactor 222 comprises a plunger which moves within a plurality of of coils energized by an A.C. source and varies the reactance of the coils to produce a signal proportional to the displacement of the plunger. The reactor 222 is positioned so that its plunger (not shown) will be actuated when the accumulator carriage 52 as it moves upwardly reaches a predetermined limiting positon. It will readily be understood that the reactor can be positioned adjacent the upper limiting position so as to be engaged by the carriage 52 or a member carried on the carriage. On the other hand, the reactor 222 can be mounted in the base portion 44 of the accumulator 40, and a horizontal cam shaft (not shown) can be provided which is driven by one of the feed screws 56 or 58. With such an arrangement there is a definite relationship between the vertical position of the carriage 52 and the cam shaft so that a cam on the cam shaft can be arranged to engage the reactor 222 when the carriage 52 reaches its upper limiting position.

Thus, while the reactor 222 normally does not produce any effective signal, it will produce an A.C. signal when the accumulator carriage 52 reaches an upper limiting position, and if the carriage moves still further upwardly, the magnitude of such signal will increase. The A.C. signal produced by the reactor 222 is conducted over line 224 to a member 226 comprising an amplifier and a rectifier which produces a negative D.C. signal which is conducted over lines 228 and 216 to the summing network 184 of the accumulator drive. Consequently, the upwardly moving accumulator carriage 52 will be slowed down once it reaches the predetermined upper limiting position. It will be understood that since the accumulator carriage 52 will be rising in the foregoing situation, the resultant input signal at the regulator 214 will be positive, and thus the negative signal from the reactor 222 will always have the effect of slowing down the carriage.

A bottom reactor 232 similar to the top reactor 222 is positioned to be actuated when the accumulator carriage 52 as it moves downwardly reaches a predetermined lower limiting position, and in the latter situation the reactor produces an A.C. signal which is conducted over a line 234 to a member 236 comprising an amplifier and rectifier which in turn conducts a negative D.C. signal over a line 238 to a summing network 240 associated with the drive system for the bead winder 42. Accordingly, when the accumulator carriage 52 as it moves downwardly reaches a lower limiting position, the winder motor 124 is slowed down. It will be understood that the bottom reactor 232 may be actuated by a cam shaft or the like as described hereinabove with respect to the top reactor 222, and it will further be understood that except as described above the bottom reactor 232 will not normally produce any effective signal. In addition to the top and bottom reactors 222 and 232 which slow down the operation of certain components when the accumulator carriage 52 reaches predetermined upper and lower limiting positions, upper and lower limit switches (not shown) may also be provided to completely shut down the bead making system if the carriage 52 reaches certain extreme upper and lower limiting positions.

Referring now to the bead winder drive system, the programmer 110 and reactor 148 have been described earlier herein in conjunction with FIGURES 4–6, and as previously stated the programmer is driven from the winder motor 124, and the cam 140 actuates the reactor 148 to produce an A.C. signal which will vary in magnitude in accordance with the shape of the cam 140. Thus, the cam 140 controls a first slow acceleration rate for the winder drum 96 and its time of application, a second final acceleration rate, maximum speed reference, and the deceleration rate. The bead winder drum 96 is preferably started out at a slow acceleration rate to prevent the wires from pulling out of the winder grippers 98, and then the drum is accelerated at an increased rate. The signal produced by the reactor 148 is conducted over line 242 to a member 244 comprising an amplifier and a rectifier which conducts a negative D.C. signal over a line 246 to the summing network 188. The D.C. signal is then conducted through a normally closed switch 248 to a junction 250 and then to the summing network 240 which supplies an input signal to a winder speed regulator 252. It will be noted that the negative signal produced by the winder tachometer generator 204 is fed back along a line 256 to the summing network 240 of the winder drive system.

It was previously explained that as the cam 140 moves the plunger 146 associated with the reactor 148, the signal produced by the reactor varies in magnitude in accordance with the displacement of the plunger. In the particular embodiment being described, the reactor 148 produces a negative signal which is initially of a high magnitude, and as the plunger 146 is displaced by the cam 140 the negative signal decreases in magnitude. Thus, at the beginning of a bead making cycle the negative D.C. signal produced by the reactor 148 approximately offsets the positive reference signal from the bias 260. The bias circuit 260 supplies a signal to the junction 188 which is a full constant positive voltage. At the start of a cycle this positive voltage is nearly completely counteracted by a high negative voltage supplied by the reactor 148 which is positioned by the cam 140. As the winder drum 96 rotates, the cam 140 acts on the reactor 148 to gradually decrease the negative signal conducted along line 246 to the junction 188, and thus due to the constant positive reference signal from the bias 260, the resultant positive input signal supplied to the regulator 252 is increased so as to increase the speed of the winder drum.

Thus, the combined signal conducted from the junction 188 to the summing network 240 will be positive, and as the winder speed increases, the negative feedback signal from the winder tachometer 204 will also increase, producing a resultant input signal at the regulator 252 which will cause the winder motor 124 to drive the winder drum 96 at a speed determined by the magnitude of the reference signal from junction 188. It is the cam 140 which determines a first slow acceleration rate for the winder drum 96 and its time of application, a second final acceleration rate, a maximum speed reference, and the deceleration rate. The resultant input signal is supplied by the summing network 240 to the regulator 252 which comprises a D.C. transistor amplifier and two magnetic amplifiers, one of the magnetic amplifiers being used to energize the windings 166 of the generator 160, and the other being utilized to energize the winding 168 of the winder motor 124. The generator 160 controls the armature voltage of the D.C. motor 124, both armature and field winding control being used on the motor in order to provide the widest possible speed range. The voltage regulator 252 brings the motor 124 up to the desired reference speed by first bringing the generator 160 to full voltage and then weakening the motor field to obtain the desired speed.

FIGURE 7 shows a further reference voltage supply 262 associated with the winder drive system. The voltage supply 262 will conduct a signal to the junction 250 when a normally open switch 264 is closed. Toward the end of a bead making cycle when the winder drum 96 has been stopped and the several strands of wire have been cut by the cutting mechanism 90, the normally closed switch 248 will be opened and the normally open switch 264 will be closed, and the signal produced by the voltage supply 262 is then conducted to the regulator 252 in order to produce a slight further rotation of the winder drum 96 so as to pull in the trailing ends of the wires W and thus complete the formation of the beads.

Summarizing briefly the operation of the foregoing bead making system, at the beginning of a cycle the leading ends of the several strands of wire W are gripped in the gripper head 86 of the wire advance mechanism 78 and the latter is pivoted forwardly about the axis 88 to the position shown in solid lines in FIGURE 3 to dispose the ends of the wires in position to be gripped by the gripper means 98 associated with the winder drum 96. The wires are thus attached to the winder drum, the gripper head 86 releases the wires, and the advance mechanism 78 returns to its retracted position with the wires being adapted to move freely through the gripper head 86. The winder drum 96 is then rotated through a predetermined number of revolutions, its speed being determined by the reactor 148, and its rates of acceleration and deceleration being controlled by the cut of the cam 140 associated with the programmer 110. As the winder drum 96 rotates through a number of revolutions the several strands of wires are each wound in a corresponding groove in the winder drum in accordance with a pattern controlled by the traverse mechanism 100, thereby forming a plurality of beads of predetermined cross section. When the winder drum 96 is pulling the wires at a speed less than the desired wire speed at the extruder 36 as determined by the reference voltage supply 176, the accumulator carriage 52 is driven upwardly by the motor 60 so that the accumulator 40 fills and supplements the action of the winder drum 96 in pulling the wires through the extruder 36 to provide the desired wire speed at the extruder. When the winder drum 96 is pulling the wires at a greater speed than the desired wire speed at the extruder 36, the accumulator carriage 52 is driven downwardly by the motor 60 so that the accumulator empties and thereby partially fulfills the requirements of the winder from the wire stored in the accumulator in order to provide the predetermined wire speed at the extruder. Thus, as the cycle begins the accumulator carriage 52 will be moving upwardly at a relatively high speed which will diminish as the winder picks up speed. When the winder drum 96 reaches a speed at which it is pulling wire at the desired wire speed at the extruder, the accumulator carriage 52 stops, and then as the winder drum speed is further increased the accumulator carriage starts moving downwardly to pay out the wire.

Toward the end of the bead making cycle the winder drum 96 is stopped, the gripper head 86 of the advance mechanism 78 is actuated to grip the wires W, the cutter 90 is actuated to cut the wires, and the normally open switch 264 is closed so that a signal from the voltage supply 262 rotates the winder drum 96 somewhat further to pull in the trailing ends of the wires. The winder drum 96 is then stopped and collapsed to permit removal of the completed beads. It will be understood that when the winder drum is stopped, the accumulator carriage 52 will be driven upwardly by the motor 60 at a speed sufficient to pull the wires through the extruder 36 at the predetermined desired speed, the leading ends of the wires being held at all times either by the winder drum 96 as during the major portion of the bead making cycle, or by the gripper head 86 of the advance mechanism 78 as during cutting of the wires, pulling in the trailing ends of the beads, and removal of the completed beads. Once the winder drum has been positioned for the next cycle, the advance mechanism 78 is again actuated to pull the wires to the winder drum for attachment thereto. According to the system of the present invention substantially any number of beads can be produced during a single cycle, one strand of wire being supplied for each such bead, and each of the several strands of wire is independent of the others and has its tension controlled by a brake associated with the corresponding one of the supply reels 22.

I claim:

1. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, a wire accumulator disposed intermediate said extruder and said bead winder and having movable means movable in a first direction to fill the accumulator and in a second direction to empty the same, sensing means associated with said bead winder for producing a continuous signal of a magnitude dependent upon the rotary speed of said bead winder, and means for maintaining substantially constant wire speed from the extruder including an accumulator drive means responsive to the signal from said sensing means for driving said movable means in either of said two directions in relation to the rotary speed of said bead winder.

2. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, a wire accumulator disposed intermediate said extruder and said bead winder and having reciprocating means movable in one direction to fill the accumulator and in the opposite direction to empty the same, sensing means associated with said bead winder for producing a continuous signal of a magnitude dependent upon the rotary speed of said bead winder, and means for maintaining substantially constant wire speed from the extruder including an accumulator drive means responsive to the signal from said sensing means for driving said movable means in either of said two directions in relation to the rotary speed of said bead winder.

3. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having reciprocating means movable in one direction to fill the accumulator and in the opposite direction to empty the same, sensing means associated with said bead winder for producing a continuous signal of a magnitude dependent upon the rotary speed of said bead winder, and means for maintaining substantially constant wire speed from the extruder including an accumulator drive means responsive to the signal from said sensing means for driving said reciprocating means in either of said two directions in relation to the rotary speed of said bead winder.

4. In a bead making system, in combination, a plurality of wire supply means for supplying a plurality of continuous lengths of bead wire, an extruder through which said wires are pulled to apply a coating to each of said wires, a bead winder having gripping means for gripping the leading ends of said wires, said bead winder being rotatable so as to pull said wires through said extruder and wind the wires to form a plurality of beads, one bead being formed from each of said wires, winder drive means for rotating said winder at a variable speed during a bead making cycle, a wire accumulator disposed intermediate said extruder and said bead winder and having reciprocating means movable in one direction to fill the accumulator and in the opposite direction to empty the same, sensing means associated with said bead winder for producing a continuous signal of a magnitude dependent upon the rotary speed of said bead winder, and means for maintaining substantially constant wire speed from the extruder including accumulator drive means responsive to the signal from said sensing means for driving said reciprocating means in either of said two directions in relation to the rotary speed of said bead winder.

5. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having movable means movable in a first direction to fill the accumulator and in a second direction to empty the same, control means for selecting a predetermined constant wire speed from the extruder, sensing means associated with said bead winder for producing a continuous signal of a magnitude dependent upon the rotary speed of sail bead winder, and means for regulating wire speed from the extruder substantially in accordance with said predetermined wire speed including accumulator drive means responsive to the signal from said sensing means for driving said movable means in either of said two directions in relation to the rotary speed of said bead winder.

6. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having reciprocating means movable in one direction to fill the accumulator and in the opposite direction to empty the same, control means for selecting a predetermined wire speed from the extruder, sensing means associated with said bead winder for producing a continuous signal of a magnitude dependent upon the rotary speed of said bead winder, and means for regulating wire speed from the extruder substantially in accordance with said predetermined constant speed including accumulator drive means responsive to the signal from said sensing means for driving said reciprocating means in either of said two directions in relation to the rotary speed of said bead winder.

7. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having reciprocating means movable in one direction to fill the accumulator and in the opposite direction to empty the same, control means for selecting a predetermined constant wire speed from the extruder, sensing means associated with said bead winder for producing a continuous signal of a magnitude dependent upon the rotary speed of said bead winder, and means for regulating wire speed from the extruder substantially in accordance with said predetermined wire speed including accumulator drive means responsive to the signal from said sensing means for driving said reciprocating means in either of said two directions, said accumulator drive means being arranged so that it drives said reciprocating means in said one direction to fill the accumulator when said winder is pulling wire at less than said predetermined wire speed and drives said reciprocating means in said opposite direction to empty the accumulator when said winder is pulling wire at greater than said predetermined wire speed so as to maintain said predetermined wire speed from the extruder.

8. In a bead making system, in combination, a plurality of wire supply means for supplying a plurality of continuous lengths of bead wire, an extruder through which said wires are pulled to apply a coating to each of said wires, a bead winder having gripping means for gripping the leading ends of said wires, said bead winder being rotatable so as to pull said wires through said extruder and wind the wires to form a plurality of beads, one bead being formed from each of said wires, winder drive means for rotating said winder at a variable speed during a bead making cycle, a wire accumulator disposed intermediate said extruder and said bead winder and having reciprocating means movable in one direction to fill the accumulator and in the opposite direction to empty the same, control means for selecting a predetermined constant wire speed from the extruder, sensing means associated with said bead winder for producing a continuous signal of a magnitude dependent upon the rotary speed of said bead winder, and means for regulating wire speed from the extruder substantially in accordance with said predetermined wire speed including accumulator drive means responsive to the signal from said sensing means for driving said reciprocating means in either of said two directions, said accumulator drive means being arranged so that it drives said reciprocating means in said one direction to fill the accumulator when said winder is pulling the wires at less than said predetermined wire speed and drives said reciprocating means in said opposite direction to empty the accumulator when said winder is pulling the wires at greater than said predetermined wire speed so as to maintain said predetermined wire speed from the extruder.

9. In a bead making system, in combination, wire supply means for supplying a continuous length of bead wire, an extruder through which said wire is pulled to apply a coating thereto, a bead winder having first gripping means for gripping the leading end of said wire, said bead winder being rotatable so as to pull said wire through said extruder and wind the wire to form a bead, wire advance mechanism operative to advance the leading end of said continuous length of wire to said first gripping means at the beginning of each bead making cycle, said advance mechanism having second gripping means for gripping said wire, at least one of said first and second gripping means always being operative to grip said wire approximately at the leading end thereof, winder drive means for rotating said winder at a variable speed during a bead making cycle, a wire accumulator disposed intermediate said extruder and said bead winder and having reciprocating means movable in one direction to fill the accumulator and in the opposite direction to empty the same, sensing means associated with said bead winder for producing a continuous signal of a magnitude dependent upon the rotary speed of said bead winder, and means for maintaining substantially constant wire speed from the extruder including accumulator drive means responsive to the signal from said sensing means for driving said movable means in either of said two directions in relation to the rotary speed of said bead winder.

10. In a bead making system, in combination, wire supply means for supplying a continuous length of bead wire, an extruder through which said wire is pulled to apply a coating thereto, a bead winder having first gripping means for gripping the leading end of said wire, said bead winder being rotatable so as to pull said wire through said extruder and wind the wire to form a bead, wire advance mechanism operative to advance the leading end of said continuous length of wire to said first gripping means at the beginning of each bead making cycle, said advance mechanism having second gripping means for gripping said wire, at least one of said first and second gripping means always being operative to grip said wire approximately at the leading end thereof, winder drive means for rotating said winder at a variable speed during a bead making cycle, a wire accumulator disposed intermediate said extruder and said bead winder and having reciprocating means movable in one direction to fill the accumulator and in the opposite direction to empty the same, control means for selecting a predetermined constant wire speed from the extruder, sensing means associated with said bead winder for providing a continuous signal of a magnitude dependent upon the rotary speed of said bead winder, and means for regulation wire speed from the extruder substantially in accordance with said predetermined wire speed including accumulator drive means responsive to the signal from said sensing means for driving said reciprocating means in either of said two directions, said accumulator drive means being arranged so that it drives said reciprocating means in said one direction to fill the accumulator when said winder is pulling wire at less than said predetermined wire speed and drives said reciprocating means in said opposite direction to empty the accumulator when said winder is pulling wire at greater than said predetermined wire speed so as to 11. In a bead making system, in combination, wire supply means for supplying a continuous length of bead wire, an extruder through which said wire is pulled to apply coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having a first plurality of rolls mounted on spaced parallel fixed axes and a second plurality of moveable rolls, said movable rolls being carried in spaced relation on a reciprocating carriage member which is movable in one direction to fill the accumulator and in the opposite direction to empty the same, sensing means associated with said bead winder for providing a continuous signal of a magnitude dependent upon the rotary speed of said bead winder, and means for maintaining substantially constant wire speed from the extruder including accumulator drive means responsive to the signal from said sensing means for driving said reciprocating carriage in either of said two directions in relation to the rotary speed of the bead winder.

12. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having a first plurality of rolls mounted on spaced parallel fixed axes and a second plurality of movable rolls, said movable rolls being carried in spaced relation on a reciprocating carriage member which is movable in one direction to fill the accumulator and in the opposite direction to empty the same, control means for selecting a predetermined constant wire speed from the extruder, sensing means associated with said bead winder for producing a continuous signal of a magnitude dependent upon the rotary speed of said bead winder, and means for regulating wire speed from the extruder substantially in accordance with said predetermined wire speed including accumulator drive means responsive to the signal from said sensing means for driving said reciprocating carriage in either of said two directions, said accumulator drive means being arranged so that it drives said carriage in said one direction to fill the accumulator when said winder is pulling wire at less than said predetermined wire speed and drives said carriage in said opposite direction to empty the accumulator when said winder is pulling wire at greater than said predetermined wire speed so as to maintain said predetermined wire speed from the extruder.

13. In a bead making system, in combination, a plurality of wire supply means for supplying a plurality of continuous lengths of bead wire, an extruder through which said wires are pulled to apply a coating to each of said wires, a bead winder having gripping means for gripping the leading ends of said wires, said bead winder being rotatable so as to pull said wires through said extruder and wind the wires to form a plurality of beads, one bead being formed from each of said wires, winder drive means for rotating said winder at a variable speed during a bead making cycle, a wire accumulator disposed intermediate said extruder and said bead winder and having a first plurality of rolls mounted in a row on spaced parallel fixed axes and a second plurality of movable rolls, said movable rolls being mounted in a row in spaced relation on a reciprocating carriage member which is movable in one direction to fill the accumulator and in the opposite direction to empty the same, control means for selecting a predetermined constant speed from the extruder, sensing means associated with said bead winder for producing a continuous signal of a magnitude dependent upon the rotary speed of said bead winder, and means for regulating wire speed from the extruder substantially in accordance with said predetermined wire speed including accumulator drive means responsive to the signal from said sensing means for driving said reciprocating carriage in either of said two directions, said accumulator drive means being arranged so that it drives said carriage in said one direction to fill the accumulator when said winder is pulling the wires at less than said predetermined wire speed and drives said carriage in said opposite direction to empty the accumulator when said winder is pulling the wires at greater than said predetermined wire speed so as to maintain said predetermined wire speed from the extruder.

14. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having movable means movable in a first direction to fill the accumulator and in a second direction to empty the same, control means for selecting a predetermined constant wire speed at the extruder, means for regulating wire speed from the extruder substantially in accordance with said predetermined wire speed including accumulator drive means for driving said movable means in either of said two directions, accumulator regulator means for controlling the operation of said accumulator drive means in response to signals, means for supplying to said accumulator regulator means a first electrical reference signal of a magnitude determined by the setting of said control means, and means for supplying to said accumulator means a second electrical signal proportional to the speed of rotation of said winder, said accumulator regulator means including a summing network to receive said first and second electrical signals.

15. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having movable means movable in a first direction to fill the accumulator and in a second direction to empty the same, control means for selecting a predetermined constant wire speed from the extruder, means for regulating wire speed from the extruder substantially in accordance with said predetermined wire speed including accumulator drive means for driving said movable means in either of said two directions, accumulator regulator means for controlling the operation of said accumulator drive means in response to signals, means for supplying to said accumulator regulator means a first electrical reference signal of a magnitude determined by the setting of said control means, means for supplying to said accumulator regulator means a second electrical signal proportional to the speed of rotation of said winder, and means for supplying to said accumulator regulator means a third electrical feedback signal proportional to the speed of the accumulator movable means, the polarity of said third signal depending upon the direction of movement of said movable means, said accumulator regulator means including a summing network to receive said first, second and third electrical signals.

16. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having reciprocating means movable in one direction to fill the accumulator and in the opposite direction to empty the same, control means for selecting a prodetermined constant wire speed from the extruder, means for regulating wire speed from the extruder substantially in accordance with said predetermined wire speed including accumulator drive means for driving said reciprocating means in either of said two directions, said accumulator drive means being arranged so that it drives said reciprocating means in said one direction to fill the accumulator when said winder is pulling wire at less than said predetermined wire speed and drives said reciprocating means in said opposite direction to empty the accumulator when said winder is pulling wire at greater than said predetermined wire speed, accumulator regulator means for controlling the operation of said accumulator drive means in response to electrical signals, means for supplying to said accumulator regulator means a first electrical reference signal of a magnitude determined by the setting of said control means, means for supplying to said accumulator regulator means a second electrical signal proportional to the speed of rotation of said winder, and means for supplying to said accumulator regulator means a third electrical feedback signal proportional to the speed of said accumulator reciprocating means, the polarity of said third signal depending upon the direction of movement of said reciprocating means, said accumulator regulator means including a summing network to receive said first, second and third electrical signals.

17. In a bead making system, in combination, wire supply means for supplying a continuous length of bead wire, an extruder through which said wire is pulled to apply a coating thereto, a bead winder having gripping means for gripping the leading end of said wire, said bead winder being rotatable so as to pull said wire through said extruder and wind the wire to form a bead, winder drive means for rotating said winder at a variable speed during a bead making cycle, a wire accumulator disposed intermediate said extruder and said bead winder and having reciproacting means movable in one direction to fill the accumulator and in the opposite direction to empty the same, control means for selecting a predetermined constant wire speed from the extruder, means for regulating wire speed from the extruder substantially in accordance with said predetermined wire speed including accumulator drive means for driving said reciprocating means in either of said two directions, said accumulator drive means being arranged so that it drives said reciprocating means in said one direction to fill the accumulator when said winder is pulling wire at less than said predetermined wire speed and drives said reciprocating means in said opposite direction to empty the accumulator when said winder is pulling wire at greater than said predetermined wire speed, accumulator regulator means for controlling the operation of said accumulator drive means in response to electrical signals, voltage supply means for supplying to said accumulator regulator means a first electrical reference signal of a magnitude determined by the setting of said control means, a first tachometer generator driven by said winder drive means for supplying to said accumulator regulator means a second electrical signal having a magnitude proportional to the speed of rotation of said winder, and a second tachometer generator driven by said accumulator drive means for supplying to said accumulator regulator means a third electrical feedback signal having a magnitude proportional to the speed of said accumulator reciprocating means, the polarity of said third signal depending upon the direction of movement of said reciprocating means.

18. The invention of claim 17 wherein the diameter of said rotatable bead winder is adjustable, and wherein a diameter compensator comprising a potentiometer is provided to modify the magnitude of said second electrical signal in accordance with the diameter of said bead winder.

19. The invention of claim 17 wherein said accumulator drive means comprises a contactless, fully reversible variable voltage D.C. drive system which is infinitely adjustable through a zero position and can hover at zero, and wherein the direction in which said reciprocating means is driven depends upon the polarity of a resultant input signal to said drive system which input signal is comprised of said first, second and third electrical signals.

20. The invention of claim 17 wherein said first electrical reference signal is supplied to said winder drive means for determining the speed of said bead winder, and wherein programmer means is provided for modifying said first reference signal at said winder drive means in order to control the rates of acceleration and deceleration of said bead winder and also the speed of said bead winder throughout its cycle of operation.

References Cited

UNITED STATES PATENTS

| 1,841,260 | 1/1932 | Slusher | 156—422 X |
| 1,927,811 | 9/1933 | Stevens | 156—422 |
| 2,902,083 | 9/1959 | White | 156—136 |
| 2,907,565 | 10/1959 | Sauter | 226—118 X |
| 3,049,308 | 8/1962 | Lang | 226—118 X |

FOREIGN PATENTS 616,271   1/1949   Great Britain.

OTHER REFERENCES

IBM Technical Disclosure Bulletin, vol. 1, No. 5, February 1959, page 24.

EARL M. BERGERT, Primary Examiner

C. B. COSBY, Assistant Examiner

U.S. Cl. X.R.

156—136; 226—14, 118, 119